UNITED STATES PATENT OFFICE.

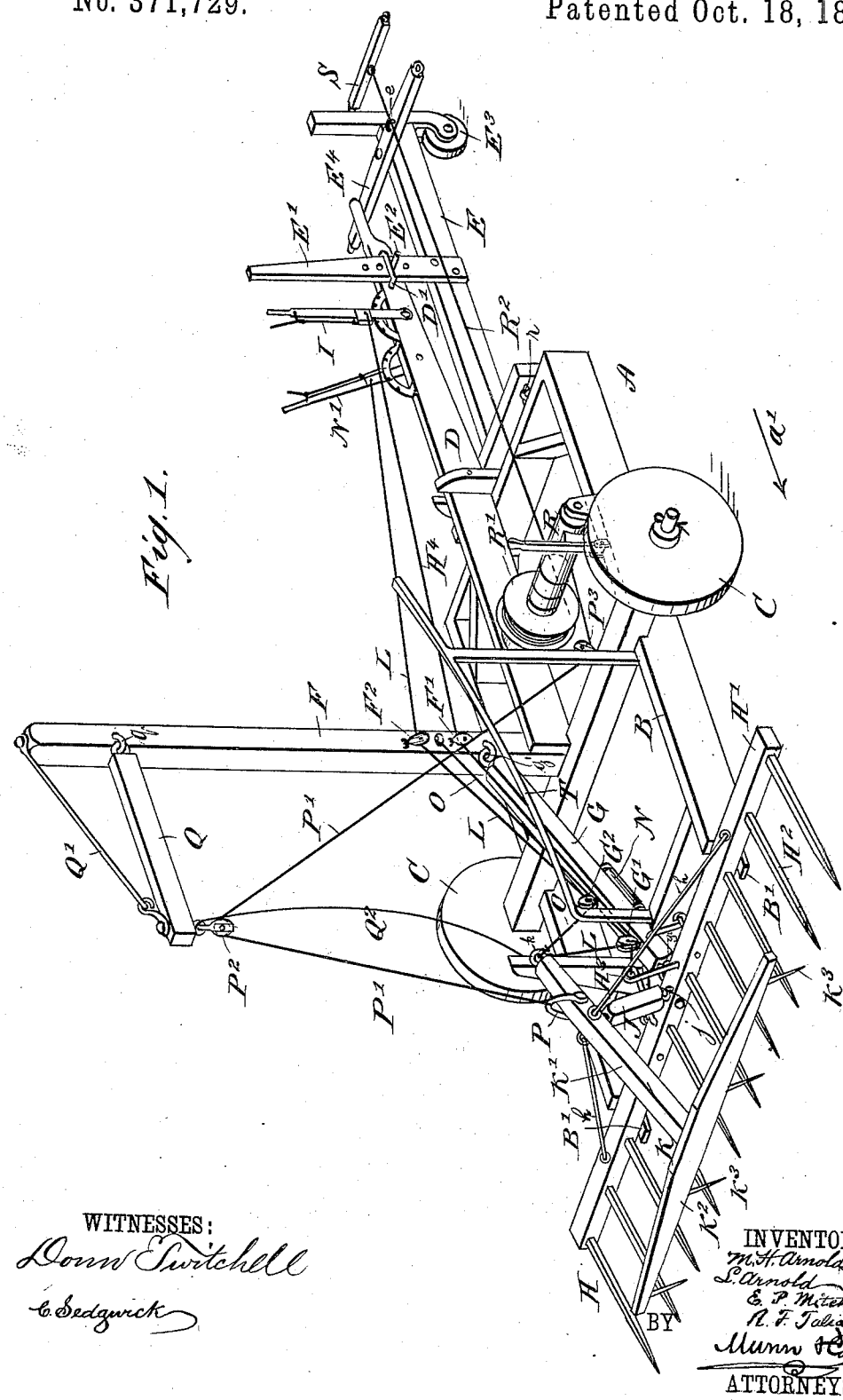

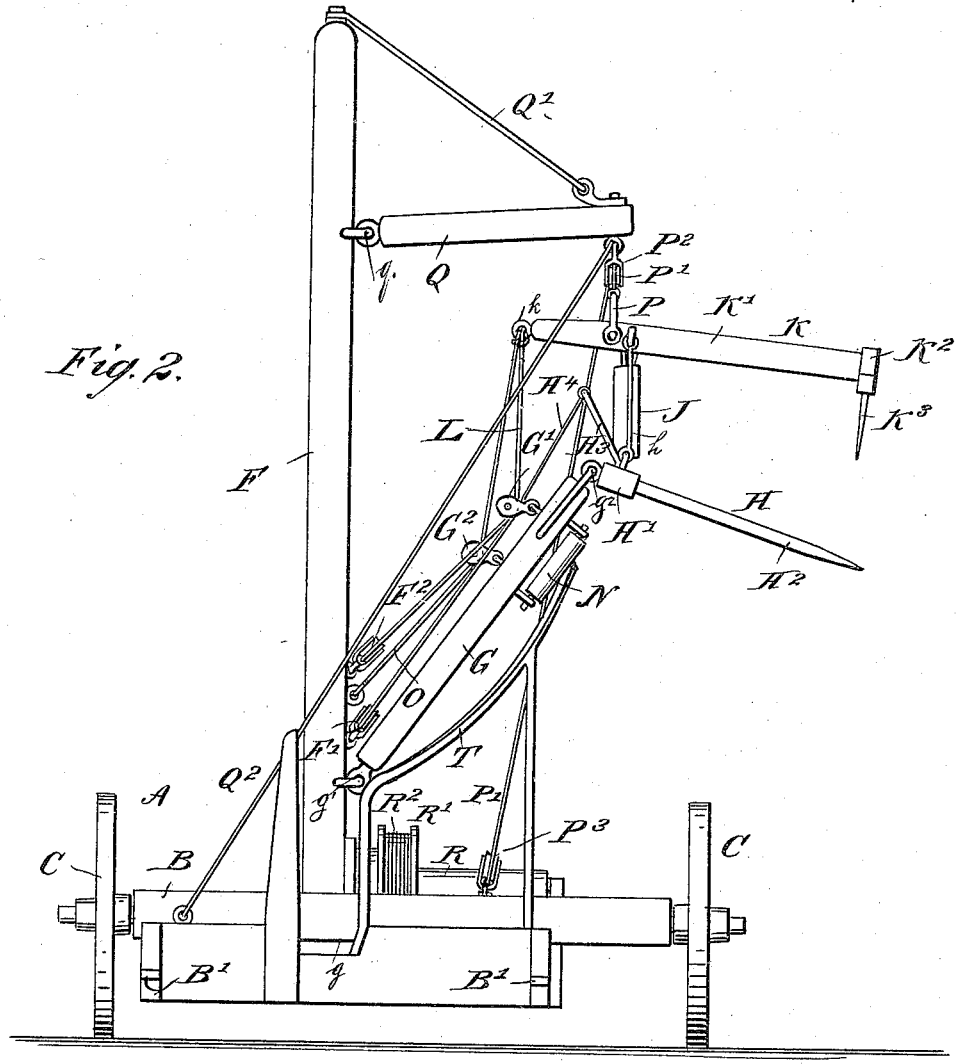

MATTHEW H. ARNOLD, LEROY ARNOLD, EDWARD P. MITCHELL, AND RUBEN F. TALIAFERRO, OF HUENEME, CALIFORNIA.

HAY-LOADING MACHINE.

SPECIFICATION forming part of Letters Patent No. 371,729, dated October 18, 1887.

Application filed December 28, 1886. Serial No. 222,784. (No model.)

*To all whom it may concern:*

Be it known that we, MATTHEW H. ARNOLD, LEROY ARNOLD, EDWARD P. MITCHELL, and RUBEN F. TALIAFERRO, all of Hueneme, in the county of Ventura and State of California, have invented a new and Improved Hay Rake and Loader, of which the following is a full, clear, and exact description.

The object of our invention is to provide a new and improved machine for loading hay or grain upon wagons which is simple in construction and very effective in operation.

The invention consists of various parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1 is a perspective view of our improvement, and Fig. 2 is an end elevation of the same, showing the machine in position for unloading.

The truck A consists of the frame B, mounted on the wheels C, and of the arm D, having on its outer end a loop, D', through which passes the upright bar E', secured to the tongue E, pivoted on its inner end to the frame B by eyebolts $e$. The upright bar E' is provided with a number of apertures, through one of which passes a pin, $E^2$, which also passes through a corresponding aperture in the arm D, so that the latter can be adjusted on the upright bar E', thus tilting the frame B to any desired position. On the outer end of the tongue E is mounted a steering and supporting wheel, $E^3$, and a doubletree, $E^4$, to which the team is hitched for propelling the machine.

On the frame B is erected the upright post F, near the lower end of which is hinged by an eyebolt and staple, $g'$, forming a universal joint, one end of an arm, G, which has its other end pivotally connected by a similar connection, $g^2$, with the platform-rake H, consisting of the cross-bar H' and the prongs $H^2$. The cross-bar H' rests, when in its lowest position, as shown in Fig. 1, on the shoulders B', formed on the side bars of the frame B, and the outer end of the arm G rests in a notch, $g$, formed on the outer cross-bar of the frame B. In the middle of the cross-bar H' is erected a short arm, $H^3$, to the upper end of which is secured a rope or chain, $H^4$, passing under a sheave, G', on the arm G, and then over a sheave, F', secured on the upright post F, and then leading to the lever I and fastened on the same. The lever I is pivoted on the outer end of the arm D, and is of any approved construction.

To the cross-bar H' is pivoted, by eyebolts and staples $j$, a link, J, pivotally connected to the arm K' of the fork K, provided with the cross-arm $K^2$, carrying the downwardly-extending prongs $K^3$. The arm K' is also connected at its opposite sides to the cross-bar H' by means of the stay-rods $h$. To the eye $k$ at the inner end of the arm K' is secured the rope or chain L, passing under the sheave G', and then leading to a second sheave, $F^2$, on the post F, from which it leads to and is secured to the lever N', located near the lever I, and also pivoted on the arm D of the truck-frame B. A second chain or rope, O, is secured to the eye $k$ at the inner end of the arm K', and passes under the sheave $G^2$ on the arm G to the post F, on which it is secured.

On top of the arm K' is pivoted the clevis P, on which is fastened one end of a rope or chain, P', leading upward to a sheave or pulley, $P^2$, hung on the outer end of the arm Q, and the chain or rope then passes downward and under a sheave, $P^3$, held on the frame B. The rope P' is then wound around the drum R, mounted in suitable bearings on the frame B, and provided with a pulley, R', on which is wound a chain or rope, $R^2$, passing through a staple, $e$, on the doubletree $E^4$, and carrying on its outer end a singletree, S, to which is hitched an animal for operating the rake H.

The arm Q is pivotally connected by an eyebolt and staple, $q$, with the upright F, and held in a horizontal position by the link Q', pivoted by one end on the upper end of the upright post F, and by its other end to the outer end of the arm Q, so that the latter can swing in a horizontal plane, the post F being the center. The amount of movement of the arm Q is limited, however, by the rope Q², secured by one end to the frame B, and by its other end to the said arm Q.

On the frame B is erected the incline T, leading upward from the rake end of the frame B to the left side, and on the incline T travels the roller N, secured to the under side of the arm G when the rake is lifted upward.

The operation is as follows: The hay or grain on the field is loaded on the wagon by our machine, which is driven in the direction of the arrow $a'$ by a team of horses walking in the same direction and attached to the doubletree E⁴, fastened to the tongue E. The rake H is then moved forward on the ground, so that the hay or grain gathers on top of the bars H², and the fork K is held suspended above the rake H until the latter has a load. The operator then causes the fork K to descend by throwing the lever N' forward, so that the rope L permits a downward movement of the prong end of the fork K, whereby the latter enters the hay or grain on the rake H, and thus holds the same in position. When it is desirable to load the grain or hay gathered on the rake-bars H upon a wagon which moves with the loading-machine, the forward movement of the latter is interrupted and the animal attached to the singletree S is started in the inverse direction of the arrow $a'$, so that the drum R is rotated and the rope or chain P' is wound upon the drum, thereby raising the fork and causing an upward outward movement of the rake H. The latter is held in a horizontal position or in a slightly-inclined position by the rope H⁴, which is held tightly stretched by the operator by means of the lever I. The rake H moves sidewise on account of the sidewise pull of the rope P on the arm Q, and the arm G is supported and travels upward on the incline T. As soon as the rake attains the position shown in Fig. 2, then the animal on the singletree S is stopped, at the same time releasing the rope H⁴ by throwing the lever I forward, so that the rake H swings downward on its fulcrum on the arm G to the position shown in Fig. 2, and the hay or grain on the rake-bars H² slides over the same and down upon a wagon. (Not shown in the drawings.) The rake is returned to the ground and to its normal position by allowing the drum to revolve in the opposite direction, the speed being properly regulated by a suitable brake-lever pivoted to the upper edge of the side bar, B, and having a shoe to bear on the drum R, so that the rake, with its arm G, slides downward on the incline T by its own weight and resumes its normal position. The whole machine is then moved forward again by starting up the team attached to the doubletree E⁴, and the above-described operation is repeated.

Having thus described our invention, what we claim as new, and desire to secure by Letters Patent, is—

1. In a hay rake and loader, the combination, with the truck having a vertical fixed post, of a rake at the front end of the truck, a bar having a universal and permanent connection with the lower end of the post and cross-bar or back of the rake, and mechanism for raising the rake and outer end of the bar and swinging them laterally to one side of the truck, substantially as set forth.

2. In a hay rake and loader, the combination, with the truck having a vertical fixed post, of a rake supported at the front end of the truck, a bar having a universal and permanent connection with the back of the rake and the lower end of the post, and mechanism for raising the rake and outer end of the bar and swinging them outward, substantially as set forth.

3. In a hay rake and loader, the combination of a truck, a central upright post erected on the said truck, and an incline attached to the said truck and extending upward from the front end to one side, with an arm pivoted to the lower end of the upright post, a rake pivoted on the said arm, and a fork pivotally connected to the said rake, and means, as described, for operating the said rake and the fork, substantially as set forth.

4. In a hay rake and loader, the combination of a truck and a central upright post on the said truck, with an arm swinging on the upright post, a rake pivoted to the said swinging arm, and a fork pivoted on a link attached to the said rake and located above the said rake, substantially as shown and described.

5. In a hay rake and loader, the truck A, the upright post F, mounted on the said truck, the arms G and Q, pivoted on the said posts, the rake H, pivoted on the said arm G, and the fork K, pivoted on the link J, secured on the rake H, in combination with the rope P', attached to the said fork K, the sheave P² on the said arm Q, over which the said rope P' passes, the sheave P³ on the truck A, the drum R, upon which is wound the said rope P', and means, as described, for rotating the said drum, substantially as set forth.

6. In a hay rake and loader, the truck A, the upright post F, mounted on the said truck, the arms G and Q, pivoted on the said post, the rake H, pivoted on the said arm G, and the fork K, pivoted on the link J, secured on the rake H, in combination with the rope P', attached to the said fork K, the sheave P² on the said arm Q, over which the said rope P' passes, the sheave P³ on the truck A, the drum R, upon which is wound the said rope P', the pulley R', attached to the said drum R, the rope or chain R², wound upon the said pulley R', and the singletree S, attached to the said rope R², substantially as shown and described.

7. In a hay rake and loader, the truck A, the upright post F, mounted on the said truck, the arm G, pivoted on the said post F, the rake H, pivoted on the said arm G, and the short arm H³, extending upward from the said rake H, in combination with the rope H⁴, attached to the said arm $H^3$, the sheave $G'$, under which the said rope passes, which sheave is secured to the arm G, the sheave $F'$, secured to the post F, and the lever I, connected with the said rope $H^4$, substantially as shown and described.

8. In a hay rake and loader, the truck A, the upright post F, mounted on the said truck, the arm G, pivoted on the said post, the rake H, pivoted on the said arm, the link J, pivoted on the said rake, and the fork K, pivoted on the said link J, in combination with the rope L, fastened by one end to the said fork K, the sheave $G'$ on the said arm G, the sheave $F^2$ on the upright post F, and the lever $N'$, connected with the said rope L, substantially as shown and described.

9. In a hay rake and loader, the truck A, the upright post F, mounted on the said truck, the arm G, pivoted on the said post, the rake H, pivoted on the said arm, the link J, pivoted on the said rake, means for raising the rake, and the fork K, pivoted on the said link J, in combination with the rope O, fastened by one end on the said fork K, and the sheave $G^2$, secured to the said arm G, substantially as shown and described.

10. In a hay rake and loader, the truck A, the upright post F, mounted on the said truck, the arms G and Q, pivoted on the said upright post F, and the incline T, erected on the said truck A, in combination with the rake H, pivoted on the said arm G, the arm $H^3$, secured on the said rake H, the rope $H^4$, fastened on the said arm $H^3$, the lever I, operating on the rope $H^4$, the link J, pivoted on the said rake H, the fork K, pivoted on the said link J, the rope $P'$, connected with the said fork K and passing over and under the sheaves $P^2$ and $P^3$, respectively, the drum R, on which the said rope $P'$ is wound, means, as described, for operating the drum R, the rope L, fastened to the said fork K and passing over the sheaves $G'$ and $F^2$, and the lever $N'$, for operating the said rope L, substantially as shown and described.

11. In a hay rake and loader, the rake H, the link J, pivoted on the said rake H, and the fork K, pivoted on the said link J, in combination with the rope L, fastened on the said fork K, the sheaves $G'$ and $F^2$, under and over which the said rope L passes, and the lever $N'$, for operating the said rope L, so as to throw the said fork in contact with the load on the said rake, substantially as shown and described.

MATTHEW H. ARNOLD.
LEROY ARNOLD.
EDWARD P. MITCHELL.
RUBEN F. TALIAFERRO.

Witnesses:
WILLIAM C. COOK,
WILLIAM H. BODENHAMER.